US008861453B2

(12) United States Patent
Wang et al.

(10) Patent No.: US 8,861,453 B2
(45) Date of Patent: Oct. 14, 2014

(54) SYSTEM AND METHOD FOR ALLOCATING PHYSICAL RANDOM ACCESS CHANNEL RESOURCES

(75) Inventors: Guotong Wang, Beijing (CN); Anthony Lee, San Diego, CA (US)

(73) Assignee: Via Telecom Co., Ltd., George Town, Grand Cayman (KY)

( * ) Notice: Subject to any disclaimer, the term of this patent is extended or adjusted under 35 U.S.C. 154(b) by 148 days.

(21) Appl. No.: 13/249,531

(22) Filed: Sep. 30, 2011

(65) Prior Publication Data

US 2012/0082106 A1 Apr. 5, 2012

Related U.S. Application Data

(60) Provisional application No. 61/388,430, filed on Sep. 30, 2010.

(51) Int. Cl.
*H04W 74/08* (2009.01)
*H04W 4/00* (2009.01)

(52) U.S. Cl.
CPC .............................. *H04W 74/0866* (2013.01); *H04W 4/005* (2013.01)
USPC ........... 370/329; 370/328; 370/336; 370/252; 455/522

(58) Field of Classification Search
CPC . H04W 74/08; H04W 74/0833; H04W 4/005; H04W 74/006; H04W 52/241; H04W 52/56
USPC ............................ 370/310–350, 252; 455/522
See application file for complete search history.

(56) References Cited

U.S. PATENT DOCUMENTS

| 2006/0140152 | A1* | 6/2006 | Wang et al. | 370/331 |
| 2007/0211671 | A1 | 9/2007 | Cha | |
| 2010/0329193 | A1* | 12/2010 | Bienas et al. | 370/329 |
| 2011/0013542 | A1 | 1/2011 | Yu et al. | |
| 2012/0077507 | A1* | 3/2012 | Lee | 455/450 |

FOREIGN PATENT DOCUMENTS

| CN | 101252389 | 8/2008 |
| CN | 101686544 | 3/2010 |

OTHER PUBLICATIONS

English language translation of abstract of CN 101252389 (published Aug. 27, 2008).
English language translation of abstract of CN 101686544 (published Mar. 31, 2010).

* cited by examiner

*Primary Examiner* — Jamal Javaid
(74) *Attorney, Agent, or Firm* — McClure, Qualey & Rodack, LLP

(57) ABSTRACT

A system for allocating PRACH (Physical Random Access Channel) resources is provided in the invention. The system comprises a plurality of wireless terminals and a base station. The base station is configured to allow the plurality of wireless terminals to share an access slot comprising a plurality of M2M (Machine to Machine) preambles and a plurality of H2H (Human to Human) preambles, and configured to separate the plurality of M2M preambles from the plurality of H2H preambles.

8 Claims, 5 Drawing Sheets

SYSTEM AND METHOD FOR ALLOCATING PHYSICAL RANDOM ACCESS CHANNEL RESOURCES

CROSS REFERENCE TO RELATED APPLICATIONS

This application claims the benefit of U.S. Provisional Application No. 61/388,430, filed on Sep. 30, 2010, the entirety of which is incorporated by reference herein.

BACKGROUND OF THE INVENTION

1. Field of the Invention

The disclosure generally relates to a system and a method, and more particularly, relates to a system and a method for allocating PRACH (Physical Random Access Channel) resources.

2. Description of the Related Art

Access cycles/slots are defined for MTC (Machine Type Communication) devices. Here, communication occurs merely between machines, without human beings.

Each MTC device can initiate access only at its dedicated access slot. An MTC device is associated with an access slot through its identification, IMSI (International Mobile Subscriber Identity). Under a simple circumstance, the access slot could be the paging frame for the MTC device. However, since there are multiple access preambles in one paging frame, it is a waste of access resources because only one MTC device can access only one access slot. So, there needs a new method for allocating resources to avoid the waste and re-allocate the resources.

BRIEF SUMMARY OF THE INVENTION

In one exemplary embodiment, the disclosure is directed to a base station for allocating a plurality of channel resources. The base station is configured to allow a plurality of wireless terminals to share an access slot, the access slot comprising a plurality of Machine to Machine preambles and a plurality of Human to Human preambles. The base station is configured for separating the plurality of Machine to Machine preambles with the plurality of Human to Human preambles. Wherein, at least one of the plurality of wireless terminals are Machine Type Communication devices.

In another exemplary embodiment, the disclosure is directed to a machine type communication device for accessing to an access slot. The machine type communication device is configured to randomly select one Machine to Machine preamble among the access slot. Wherein, the access slot comprising a plurality of Machine to Machine preambles and a plurality of Human to Human preambles.

In one exemplary embodiment, the disclosure is directed to a system for allocating a plurality of channel resources. The system comprising a plurality of wireless terminals, at least one of the plurality of wireless terminals are machine type communication devices. The system also comprising a base station, the base station allowing the plurality of wireless terminals to share an access slot, the access slot comprising a plurality of Machine to Machine preambles and a plurality of Human to Human preambles, and the base station is configured for separating the plurality of Machine to Machine preambles with the plurality of Human to Human preambles.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
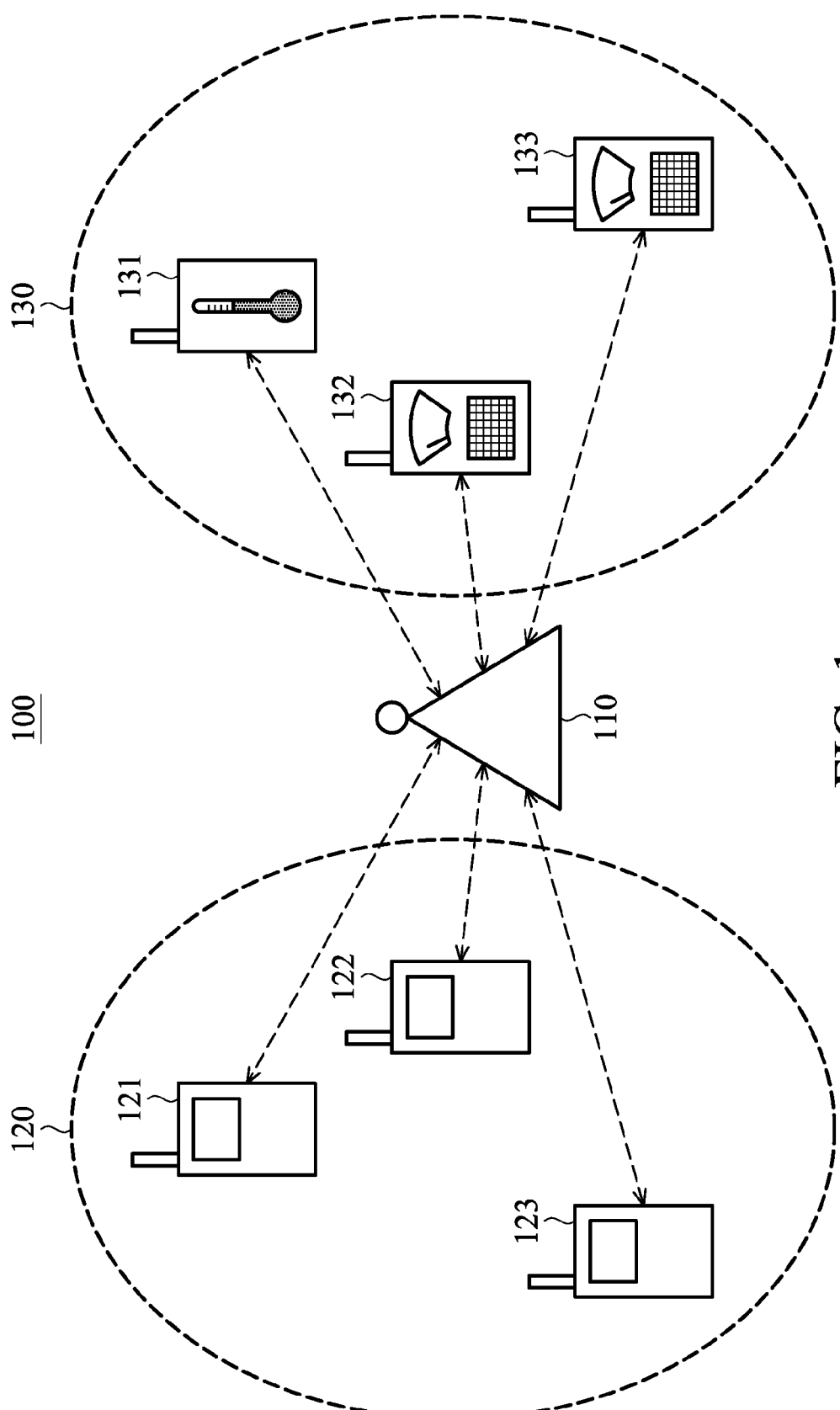
FIG. 1 is a diagram for illustrating a system for allocating PRACH (Physical Random Access Channel) resources according to an embodiment of the invention.

FIG. 1 is a diagram for illustrating a system 100 for allocating PRACH (Physical Random Access Channel) resources according to an embodiment of the invention. As shown in FIG. 1, the system 100 comprises a base station (BS) 110 and a plurality of wireless terminals 121, 122, 123, 131, 132, and 133. The plurality of wireless terminals 121, 122, 123, 131, 132, and 133 may be classified into two groups, a H2H (Human to Human) device group 120 and an MTC (Machine Type Communication) device group 130. It is noted that the MTC device group 130 is also named as an M2M (Machine to Machine) device group. The H2H device group 120 comprises the plurality of wireless terminals 121, 122 and 123, which may be mobile phones or other portable communication devices like notebook, PDA etc. The MTC device group 130 comprises the plurality of wireless terminals 131, 132 and 133, which may be temperature sensors, smart meters and/or other MTC devices. Such kind of MTC devices can transmit and/or receive data based on some predetermined instructions without human's confirmation. It is noted that each of the H2H device group 120 and the MTC device group 130 may comprises more wireless terminals than those as shown in FIG. 1, e.g., 20, 300, or 1000 wireless terminals.

Figure 2:
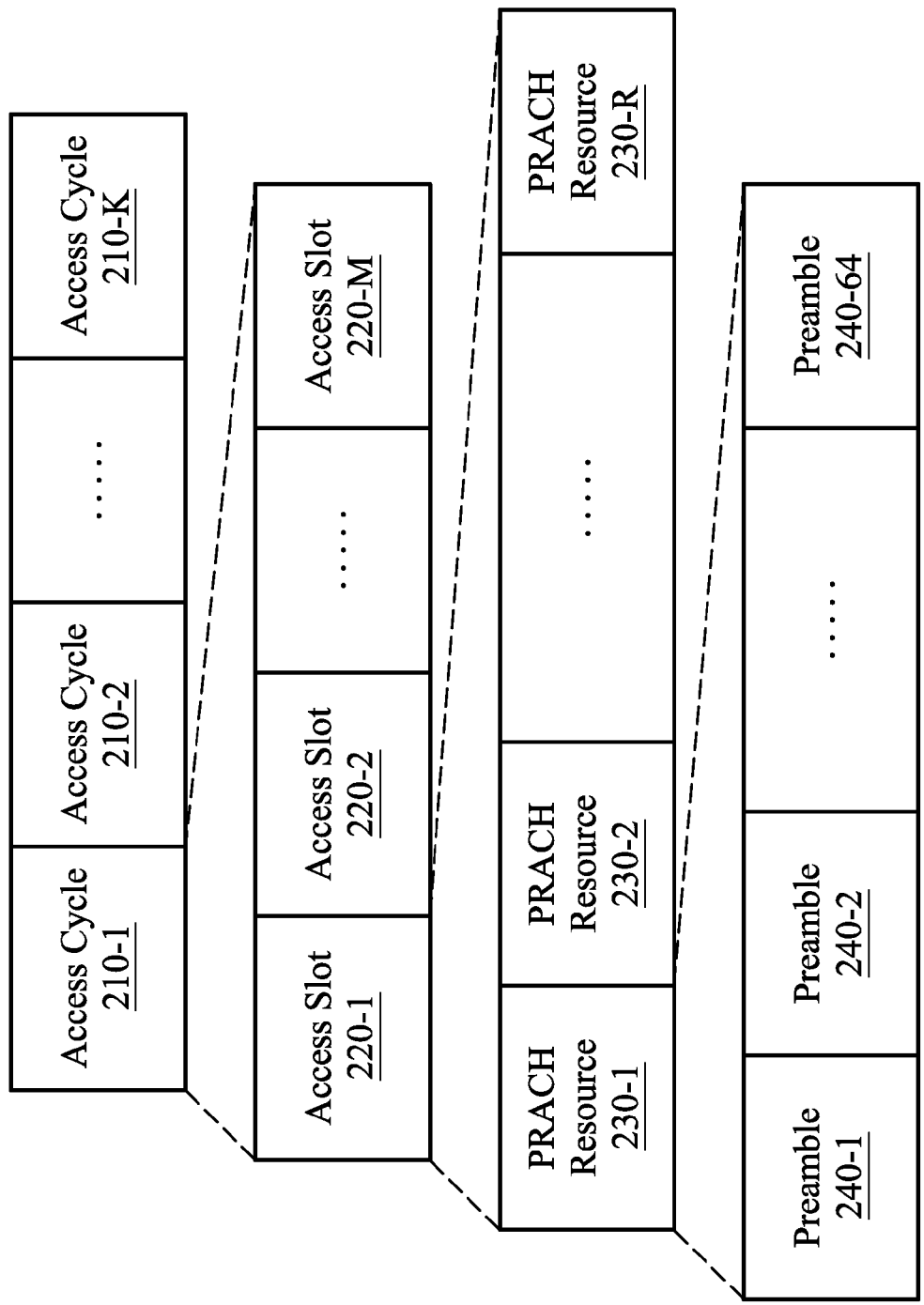
FIG. 2 is a diagram for illustrating a structure of access cycles according to an embodiment of the invention.

FIG. 2 is a diagram for illustrating a structure of access cycles according to an embodiment of the invention. As shown in FIG. 2, one or more access cycles 210-1, 210-2, . . . , and 210-K are provided, wherein K is an integer greater than or equal to 1. Each access cycle, e.g., the access cycle 210-1, comprises one or more access slots 220-1, 220-2, . . . , 220-M, wherein M is an integer greater than or equal to 1. Each access slot, e.g., the access slot 220-1, comprises a plurality of PRACH resources 230-1, 230-2, . . . , 230-R, wherein R is an integer greater than or equal to 2. PRACH resource can be seen as a group of access opportunities during a period over PRACH channel. In LTE, only one PRACH resource can be configured into a sub-frame (1 ms). PRACH resources can occur from every sub-frame to once in 20 ms. And in each PRACH resource, 64 access preambles are configured and thus there are 64 random access opportunities per PRACH resource. Each PRACH resource, e.g., the PRACH resource 230-1, comprises 64 preambles 240-1, 240-2, . . . , 240-64. PRACH resources can be seen as a group of access opportunities during a period over the PRACH channels. In LTE (Long Term Evolution) systems, only one PRACH resource can be configured into a sub-frame (1 ms). PRACH resources can occur from every sub-frame to once every 20 ms. In each PRACH resource, 64 access preambles are configured and thus there are 64 random access opportunities per PRACH resource.

Figure 3:
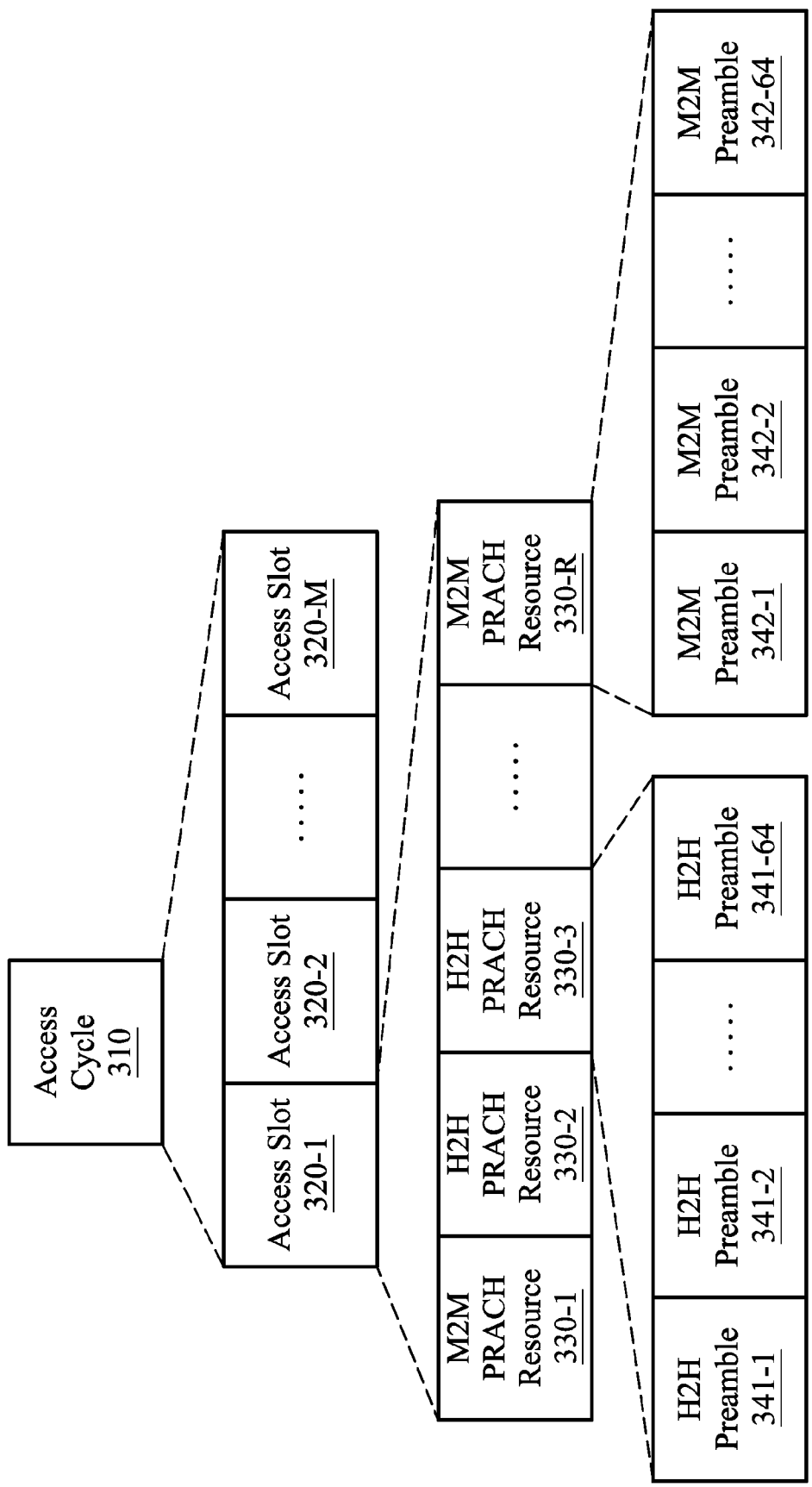
FIG. 3 is a diagram for illustrating a structure of an access cycle according to an embodiment of the invention.

FIG. 3 is a diagram for illustrating a structure of an access cycle according to an embodiment of the invention. As shown in FIG. 3, an access cycle 310 is provided. Similarly, the access cycle 310 comprises one or more access slots 320-1, 320-2, ..., 320-M, wherein M is an integer greater than or equal to 1. Each access slot, e.g., the access slot 320-1, comprises a plurality of M2M PRACH resources and a plurality of H2H PRACH resources. That is, the plurality of PRACH resources as shown in FIG. 2 may be classified into M2M PRACH resources and H2H PRACH resources. For example, as shown in FIG. 3, the access slot 320-1 may comprise M2M PRACH resources 330-1 and 330-R, and comprise H2H PRACH resources 330-2 and 330-3. Each H2H PRACH resource, e.g., the H2H PRACH resource 330-3, comprises 64 H2H preambles 341-1, 341-2, ..., and 341-64. Similarly, each M2M PRACH resource, e.g., the M2M PRACH resource 330-R, comprises 64 M2M preambles 342-1, 342-2, ..., and 342-64.

Figure 4:
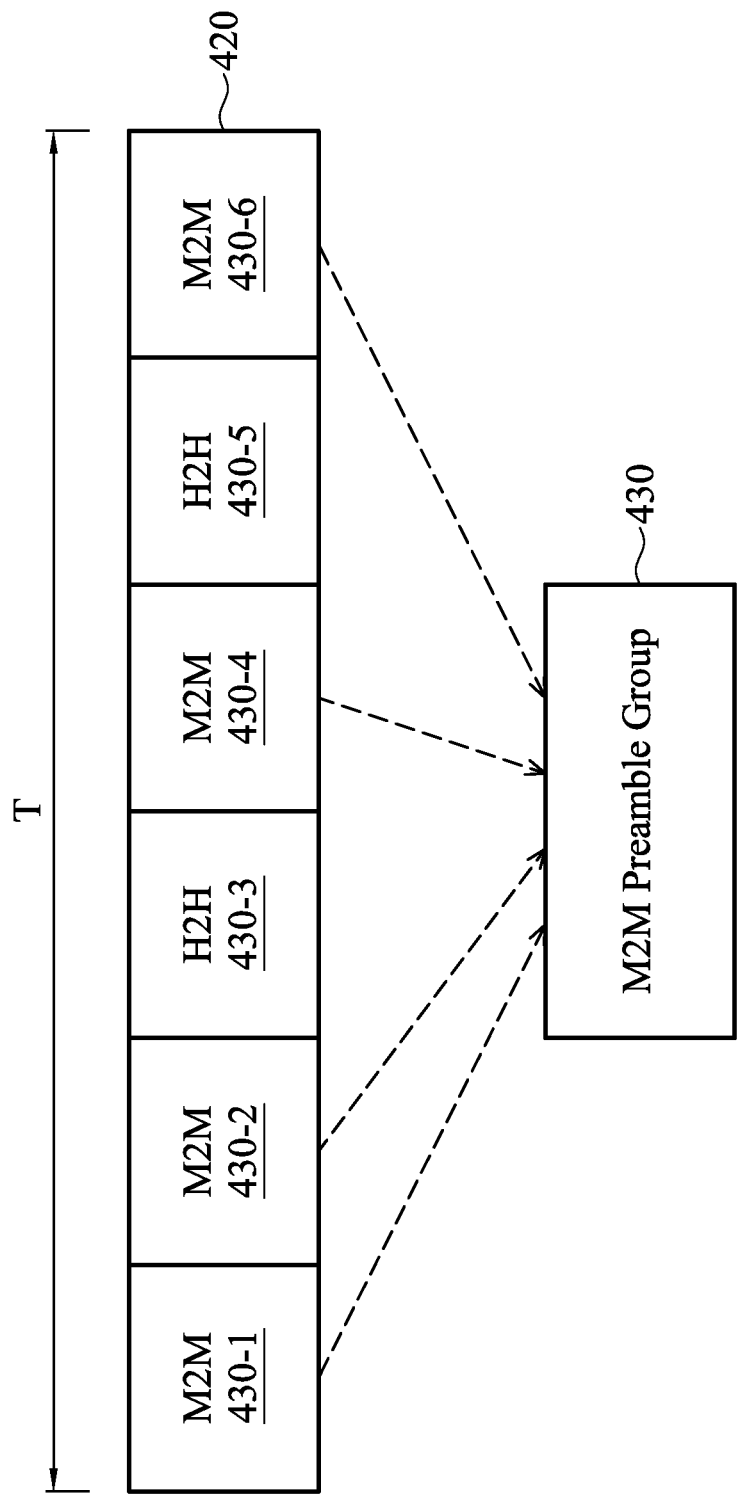
FIG. 4 is a diagram for illustrating a method for allocating PRACH resources according to an embodiment of the invention.

FIG. 4 is a diagram for illustrating a method for allocating PRACH resources according to an embodiment of the invention. As shown in FIG. 4, an access slot 420 is provided. The access slot with duration T comprises a plurality of M2M PRACH resources 430-1, 430-2, 430-4 and 430-6, and a plurality of H2H PRACH resources 430-3 and 430-5. Therefore, the access slot 420 comprises a plurality of M2M preambles and a plurality of H2H preambles.

In an embodiment of the invention, the base station 110 is configured to allow the plurality of wireless terminals 131, 132 and 133 in the MTC device group 130 to share the access slot 420. The base station 110 is configured to separate the M2M PRACH resources 430-1, 430-2, 430-4 and 430-6 from the H2H PRACH resources 430-3 and 430-5 so as to separate the plurality of M2M preambles from the plurality of H2H preambles. Furthermore, the base station 110 is configured to categorize the plurality of M2M preambles as an M2M preamble group 430. As shown in FIG. 2 and FIG. 3, there are a plurality of access slots in an access cycle. The access slot 420 may be selected randomly among the access cycle by a current wireless terminal of the plurality of wireless terminals 131, 132, and 133, wherein the current wireless terminal may be one of the plurality of wireless terminals 131, 132, and 133. In each access slot, the base station 110 may categorize the plurality of M2M preamble as the M2M preamble group 430, and then the current wireless terminal may randomly select one access slot as the access slot 420. In one embodiment, the access slot 420 is selected randomly among the access cycle according to a uniform distribution function. In another embodiment, the access slot 420 is selected randomly among the access cycle according to a Hash function. The Hash function may be set according to the IMSI of each wireless terminal.

It is noted that the duration T, number of the M2M PRACH resources, and number of the H2H PRACH resources of the access slot 420 may be adjusted by the base station 110. The base station 110 may notify the plurality of wireless terminals 131, 132 and 133 of the duration T. In another embodiment, the base station 110 may merely notify the current wireless terminal of the duration T. Then, the current wireless terminal is configured to randomly select one M2M preamble among the M2M preamble group 430 according to a uniform distribution function or a Hash function. The Hash function may be set according to the IMSI of each wireless terminal.

Figure 5:
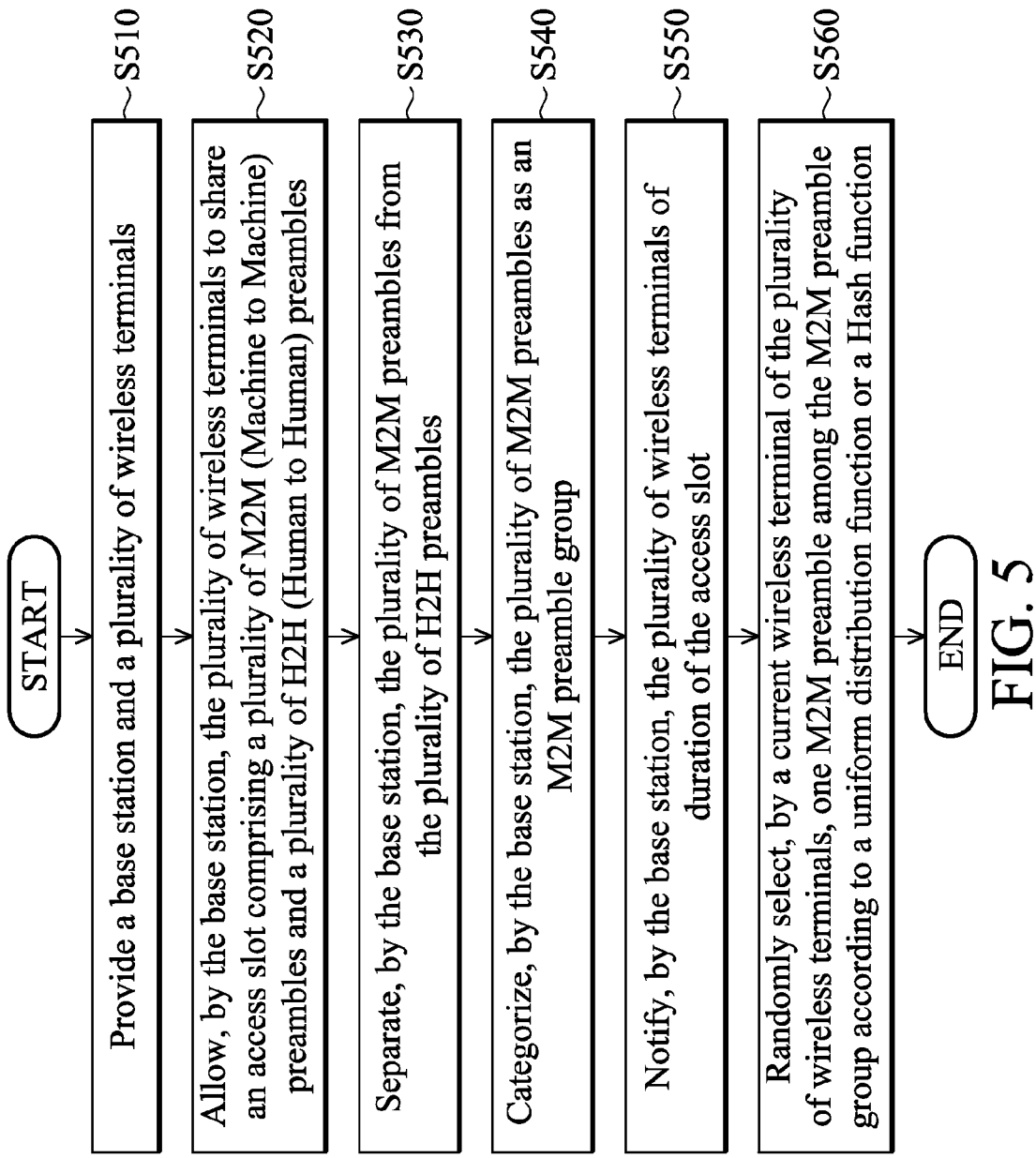
FIG. 5 is a flowchart for illustrating a method for allocating PRACH resources according to an embodiment of the invention.

FIG. 5 is a flowchart for illustrating a method for allocating PRACH resources according to an embodiment of the invention. To begin, in step S510, a base station and a plurality of wireless terminals are provided. The plurality of wireless terminals may be classified as an MTC (Machine Type Communication) device group. In step S520, the plurality of wireless terminals are allowed to share an access slot comprising a plurality of M2M (Machine to Machine) preambles and a plurality of H2H (Human to Human) preambles by the base station. It is noted that the access slot is selected randomly among the access cycle according to a uniform distribution function or a Hash function by a current wireless terminal of the plurality of wireless terminals. Then, in step S530, the plurality of M2M preambles are separated from the plurality of H2H preambles by the base station. Next, in step S540, the plurality of M2M preambles are categorized as an M2M preamble group by the base station. In step S550, the plurality of wireless terminals are notified of the duration of the access slot by the base station. Finally, in step S560, one M2M preamble is randomly selected among the M2M preamble group according to a uniform distribution function or a Hash function by the current wireless terminal. It is noted that the steps S510-S560 may not be performed in order.

In the invention, initial access attempts of MTC devices are dispersed. Thus the collision among MTC devices can be reduced. Since multiple MTC devices can access with the same access slot, the resource efficiency for access is improved. Furthermore, as PRACH resources are classified into M2M PRACH resources and H2H PRACH resources, H2H user equipments (UEs) are not influenced.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An apparatus for allocating a plurality of channel resources, comprising:
    a base station allowing a plurality of wireless terminals to share an access slot, the access slot comprising a plurality of Machine to Machine preambles and a plurality of Human to Human preambles, wherein the base station is configured for separating the plurality of Machine to Machine preambles from the plurality of Human to Human preambles and categorizing the plurality of Machine to Machine preambles as a Machine to Machine preamble group,
    wherein at least one of the plurality of wireless terminals are Machine Type Communication devices, and
    wherein one Machine to Machine preamble is selected from among the Machine to Machine preamble group by one of the plurality of wireless terminals according to a Hash function, and the Hash function is set according to an IMSI (International Mobile Subscriber Identity) of each of the plurality of wireless terminals.

2. The apparatus as claimed in claim 1, wherein the base station is further configured to notify a duration of the access slot to the plurality of wireless terminals.

3. An apparatus for accessing a base station by an access slot, comprising:
    a machine type communication device selecting one Machine to Machine preamble among the access slot, wherein the access slot comprises a plurality of Machine to Machine preambles and a plurality of Human to Human preambles, wherein the base station is configured for separating the plurality of Machine to Machine preambles from the plurality of Human to Human preambles and categorizing the plurality of Machine to Machine preambles as a Machine to Machine preamble group, wherein the base station allows a plurality of wireless terminals to share the access slot, and wherein the one Machine to Machine preamble is selected among the Machine to Machine preamble group according to a Hash function, and the Hash function is set according to an IMSI (International Mobile Subscriber Identity) of the machine type communication device.

4. A method for allocating a plurality of channel resources, comprising the steps of:

allowing, by a base station, a plurality of wireless terminals to share an access slot, the access slot comprising a plurality of Machine to Machine preambles and a plurality of Human to Human preambles, wherein at least one of the plurality of wireless terminals are machine type communication devices;

separating, by the base station, the plurality of Machine to Machine preambles from the plurality of Human to Human preambles, categorizing, by the base station, the plurality of Machine to Machine preambles as a Machine to Machine preamble group; and selecting, by one machine type communication device, one Machine to Machine preamble among the Machine to Machine preamble group, wherein the one Machine to Machine preamble is selected among the Machine to Machine preamble group according to a Hash function, and the Hash function is set according to an IMSI (International Mobile Subscriber Identity) of the machine type communication device.

5. The method as claimed in claim 4, further comprising:
notifying, by the base station, a duration of the access slot to the plurality of wireless terminals.

6. The method as claimed in claim 4, wherein the channel resources are physical random access channel resources.

7. The method as claimed in claim 4, wherein the plurality of wireless terminals are classified as a Machine Type Communication device group and a mobile communication device group.

8. A system for allocating a plurality of channel resources, the system comprising:

a plurality of wireless terminals, wherein at least one of the plurality of wireless terminals are machine type communication devices; and a base station allowing the plurality of wireless terminals to share an access slot, the access slot comprising a plurality of Machine to Machine preambles and a plurality of Human to Human preambles, wherein the base station is configured for separating the plurality of Machine to Machine preambles from the plurality of Human to Human preambles, wherein the base station is further configured to categorize the plurality of Machine to Machine preambles as a Machine to Machine preamble group, wherein one of the machine type communication devices is configured to select one Machine to Machine preamble among the Machine to Machine preamble group, and wherein the one Machine to Machine preamble is selected among the Machine to Machine preamble group according to a Hash function, and the Hash function is set according to an IMSI (International Mobile Subscriber Identity) of each of the machine type communication devices.

* * * * *